United States Patent [19]

Woerner

[11] Patent Number: 5,320,511
[45] Date of Patent: Jun. 14, 1994

[54] MULTIPLE-INJECTION MOLDING USING SINGLE-INJECTION MACHINES

[75] Inventor: Klaus D. Woerner, Cambridge, Canada

[73] Assignee: ATS Automation Tooling Systems Inc., Cambridge, Canada

[21] Appl. No.: 82,954

[22] Filed: Jun. 29, 1993

[51] Int. Cl.⁵ .......................................... B29C 45/22
[52] U.S. Cl. .................................. 425/130; 264/294;
264/297.2; 264/297.8; 264/328.8; 425/572;
425/574; 425/576
[58] Field of Search ............... 425/130, 572, 574, 575,
425/576; 264/294, 297.2, 297.8, 328.8

[56] References Cited

U.S. PATENT DOCUMENTS

| 5,020,215 | 6/1991 | Tsai | 264/297.8 |
| 5,209,889 | 5/1993 | Brown et al. | 425/575 |
| 5,211,798 | 5/1993 | Keller | 425/576 |

*Primary Examiner*—Tim Heitbrink
*Attorney, Agent, or Firm*—R. Craig Armstrong

[57] ABSTRACT

A molding apparatus utilizes two conventional single-injection molding machines and a rotatable disk positioned between those machines. The disk has four workstations, a first one and a second one opposite respective molding machines, and a third one at which molded items are removed. The molding apparatus has the advantages of lower cost and greater flexibility over double-injection molding machines.

14 Claims, 13 Drawing Sheets

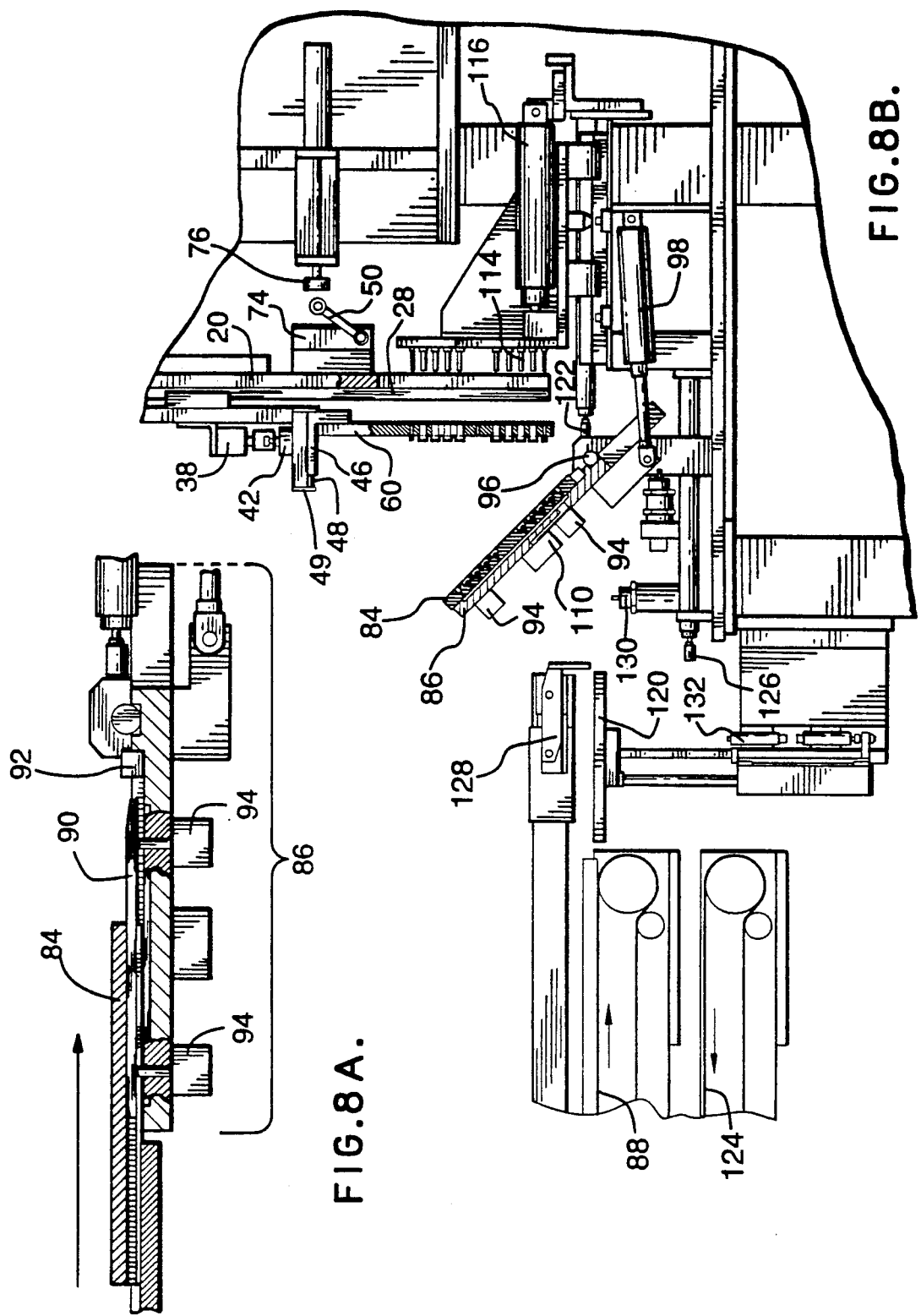

MULTIPLE-INJECTION MOLDING USING SINGLE-INJECTION MACHINES

BACKGROUND OF THE INVENTION

1. Field of the Invention

The invention relates to a multiple-injection molding apparatus, and more particularly, to an apparatus that provides multiple injection capability by using a plurality of separate single-injection unit molding machines.

Computer keyboard keys and telephone touchtone keys are among the plastic items that are produced utilizing a multiple-injection molding process. The alphanumeric characters on the face of such keys are formed from a first plastic which extends through a second plastic forming the body of the keys. Such keys are usually created in a two-step process. In the first step, the alphanumeric character is molded as a raised protrusion on a body which in the finished key forms an inner layer of the key. In a second step, a second plastic is molded around the body formed in the first step, the depth of the second plastic matching the height that the alphanumeric character is raised from that body. In a finished key the top of the alphanumeric character extends flush with the surface of the second plastic. Though someone using such keys may have the illusion that the characters are only surface deep, those characters last as long as the keys.

2. Description of the Related Art

There are several methods of creating keys with alphanumeric characters using double-injection molding. One of the methods uses the 'swing plate mold' disclosed in U.S. Pat. No. 5,020,215, granted on Jun. 4, 1991 and entitled 'Method Of An Apparatus for Manufacturing A Keyboard'. In this method, the mold assembly includes a stationery upper-half mold, a movable and rotatable lower-half mold, and a movable support plate fastened to the bottom of the lower-half mold. The lower-half mold is mounted on an axle capable of rotating it between two positions 180° apart. The cores of the mold assembly are bolted to the support plate and during the injection process extend through the lower-half mold into corresponding cavities in the upper-half mold. A first set of cores and cavities are configured to create an inner plastic body for each of the keys, those inner bodies having the alphanumeric characters as protrusions; a second set of cores and cavities are configured to create the outer plastic body of each key. At a first angular orientation, the lower-half mold is pressed between the upper-half mold and the support plate. In a first injection molding step, the first set of cores and cavities are used to create a set of the inner plastic bodies on one side of the lower-half mold. The upper-half mold and the support plate are then separated from the lower-half mold that holds the inner plastic bodies, and the lower-half mold is rotated 180°. The lower-half mold is then again pressed between the upper-half mold and the support plate, and in a second injection molding step the second set of cores and cavities are used to create the outer plastic body of each key. A removal arm on the mold assembly removes the keys from the lower-half mold by suction after the two-step injection molding.

There are certain disadvantages to the 'swing plate mold' apparatus described above. Firstly, this type of apparatus requires a double injection unit capability in the same machine, which increases both cost and complexity. Secondly, the mold platens must be large enough to accommodate the required number of molded items for both injection steps.

SUMMARY OF THE INVENTION

The multiple-injection molding apparatus of the subject invention provides for a molding operation with overlapping injection molding and removal steps. It also utilizes conventional single-injection unit molding machines, resulting in a cost saving over multiple-injection unit machines. Using a series of single-injection unit molding machines in place of a single multiple-injection unit machine of comparable size also results in a larger available molding surface, with production of a larger number of molded items during each step due to the external rotation of the molded items.

The molding apparatus of the invention comprises a rotatable disk having a series of workstations on it at equiangular positions, a plurality of separate single-injection unit molding machines positioned around the periphery of the disk, and a removal means for removing the molded items from the molding apparatus. Each workstation has a transfer plate movable radially on the disk and adapted to hold the items being molded by the molding machines. The single-injection unit molding machines are positioned around the periphery of the disk such that when one machine is adjacent a workstation each of the other machines is also adjacent a respective workstation. A transfer plate on the rotatable disk at a workstation adjacent a molding machine is adapted to be extended radially outward on the disk to sit between first and second molding platen of that machine during injection molding. The removal means removes the molded items from the molding apparatus. At a first angular position of the disk a first molding machine creates an initial form of the molded items on a transfer plate, and at subsequent angular positions the other molding machines create respective further forms of the molded items on the particular transfer plate prior to removal by the removal means.

The apparatus may utilize two single-injection unit molding machines, each positioned on diametrically-opposite sides of the rotatable disk. The disk may extend in a vertical plane, with the platens of each molding machine moving in a horizontal direction.

The molded items may be held on the transfer plate by means of a series of pins extending from the transfer plate into the space occupied by the initial form of the molded items. One of the first and second platens of each molding machine may be a core platen and the other platen a cavity platen, and during injection molding a series of cores on the core platen extend through a corresponding series of apertures in the transfer plate into a corresponding series of cavities in the cavity platen. The shape of the molded items then correspond to the injection molds defined by the relative spacing between the cores and the cavities in the cavity platen. The cores and the transfer plate apertures may be relatively sized such that during injection molding the surface of the cores and transfer plate apertures together define injection channels for material being injected into the injection molds.

The removal means may comprise a series of pins that are adapted to extend through the transfer plate at an angular position of the disk where the molded items are to be removed from the plate. In this arrangement, an arm holds a removal tray adjacent the transfer plate and has a suction means for holding the molded items in the removal tray after the pins have extended through the transfer plate to push the molded items off of the transfer plate.

BRIEF DESCRIPTION OF THE DRAWINGS

The invention will next be more fully described by means of a preferred embodiment, utilizing the accompanying drawings, in which:

FIG. 8A is a side view of a molded item removal tray entering that portion of the apparatus at which the molded items are removed.

FIG. 8B is a side view of that portion of the apparatus at which molded items are removed, the view showing a removal tray being tilted into position to remove finished molded items from a transfer plate;

DESCRIPTION OF THE PREFERRED EMBODIMENT

Figure 1:
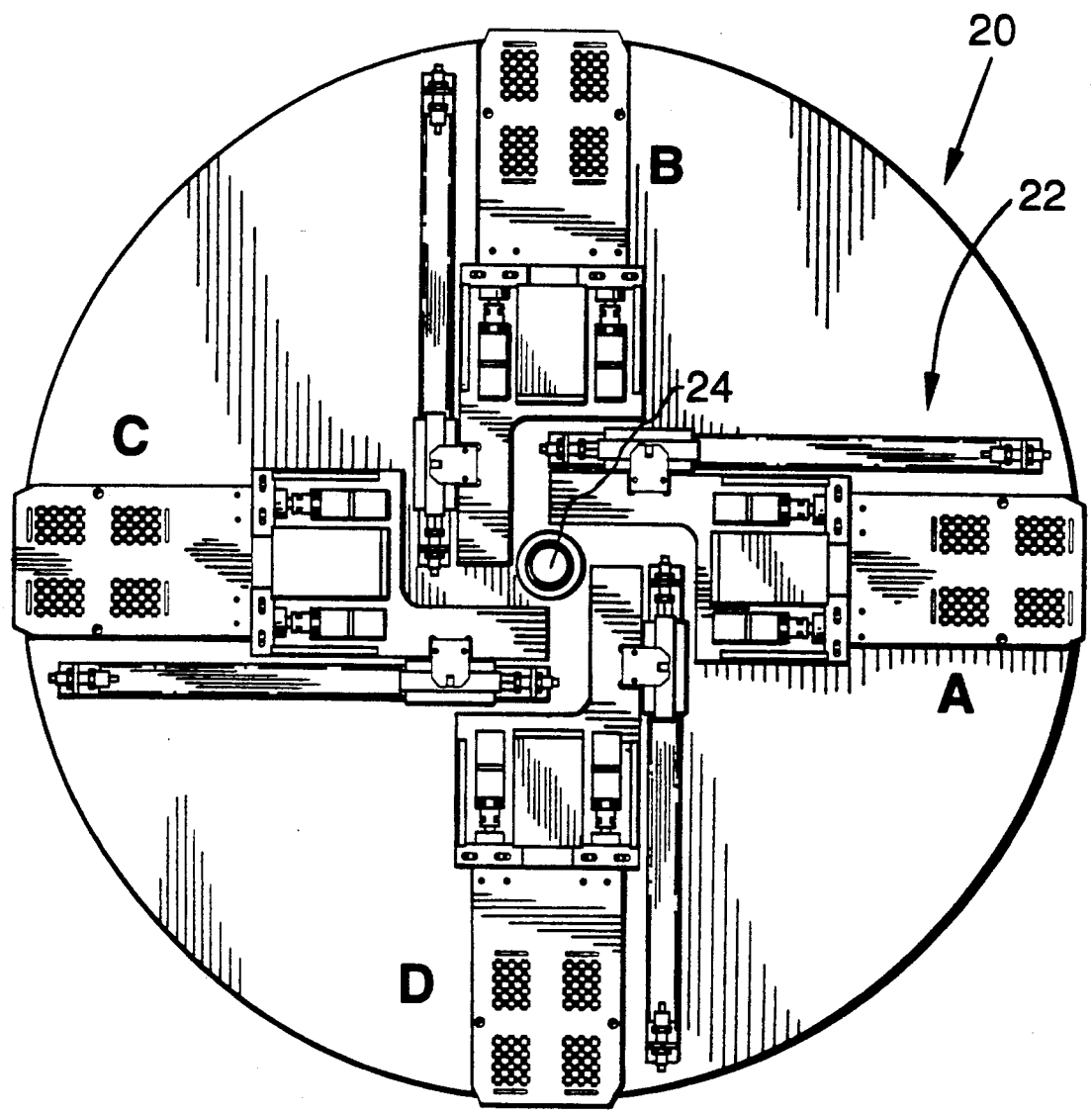
FIG. 1 is a front view of the molding apparatus of the invention, illustrating the four workstations.

With reference to FIG. 1, a rotatable disk generally designated 20 has four workstations generally designated 22 mounted on it at equiangular positions. Disk 20 extends in the vertical plane, and is mounted on an axle 24 for driven rotation. The four workstations 22 have operations carried out on them at one of four positions designated A, B, C and D in FIG. 1. Disk 20 rotates counterclockwise, such that the workstation at position D during one operation moves to position A for the next operation, the workstation at position A moves to position B, etc.

Figure 2:
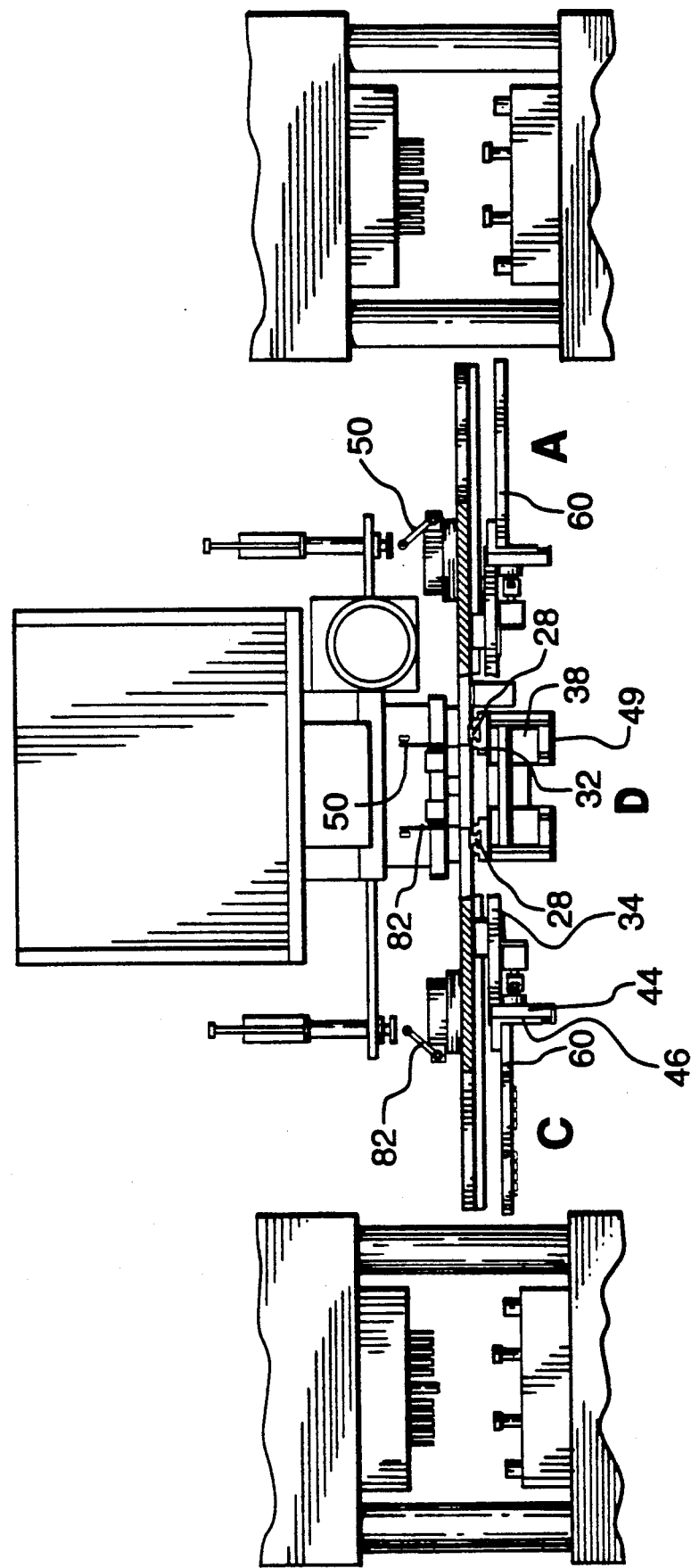
FIG. 2 is a plan view of the molding apparatus.
Figure 3:
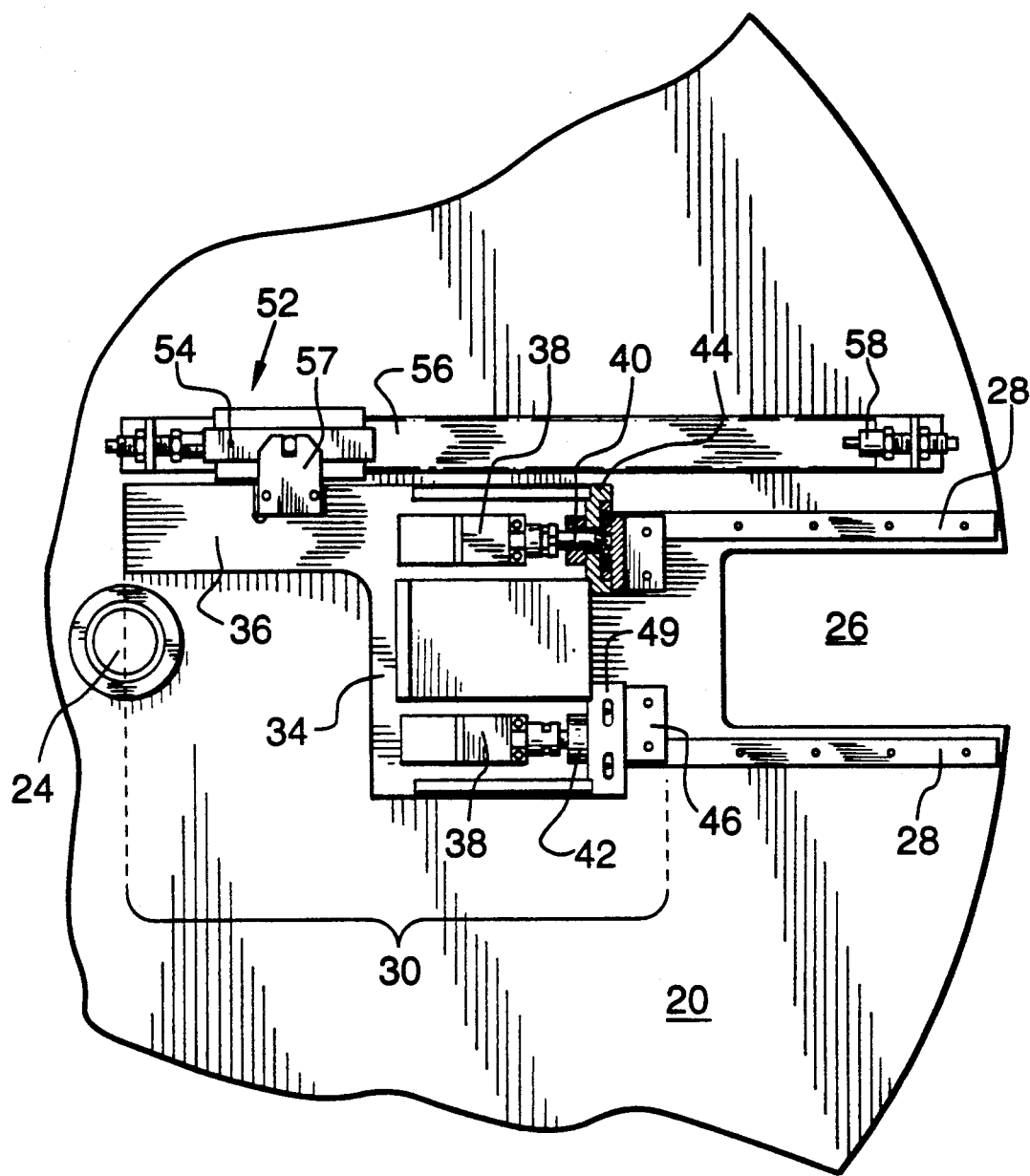
FIG. 3 is a front view of a workstation on the disk, a transfer plate not being present at the workstation.

A radial opening 26 extends in disk 20 at each workstation 22, and a pair of rails 28 are secured to disk 20 to extend on opposite sides of opening 26. As best shown in FIGS. 2 and 3, a workstation header assembly generally designated 30 is constrained for radial movement on disk 20 by a sliding engagement between the rails 28 and a pair of guide tracks 32 of header assembly 30.

Header assembly 30 is configured as an 'h', with a wide body 34 and a short connected neck 36. A pneumatic cylinder 38 is secured to each side of body 34, and a pin 40 extends from each cylinder 38. Each pin 40 passes through a respective brass bushing 42 which is mounted on a respective end plate 44 fixed to, and extending normal to body 34. As best shown in FIG. 3 and FIGS. 6A to 6D, a L-shaped transfer plate carrier 46 is slidably mounted on each end plate 44 for movement toward and away from disk 20. Each plate carrier 46 is biased by a respective spring 48 that presses on a cover plate 49, carrier 46 assuming a rest position abutting body 34. At that position, each pin 40 extends into an aperture in the respective plate carrier 46. The air supply to pneumatic cylinder 38 is controlled by a lever positioned on the back side of disk 20, as will be discussed with respect to FIG. 6C.

Each workstation 22 has a pneumatic/magnetic piston assembly generally designated 52 for moving header assembly 30 radially on disk 20. Piston assembly 52 has an external head portion 54 riding on a track 56 within which sits a magnetized pneumatically-driven piston head (not shown). One end of an arm 57 is connected to the neck 36 of header assembly 30, and the other end has a channel within which is fitted a pin on head portion 54. Head portion 54 follows movement of the magnetized piston head between the two end positions of track 56, and an adjustable dashpot 58 sits at each end position to cushion end stops.

Figure 4:
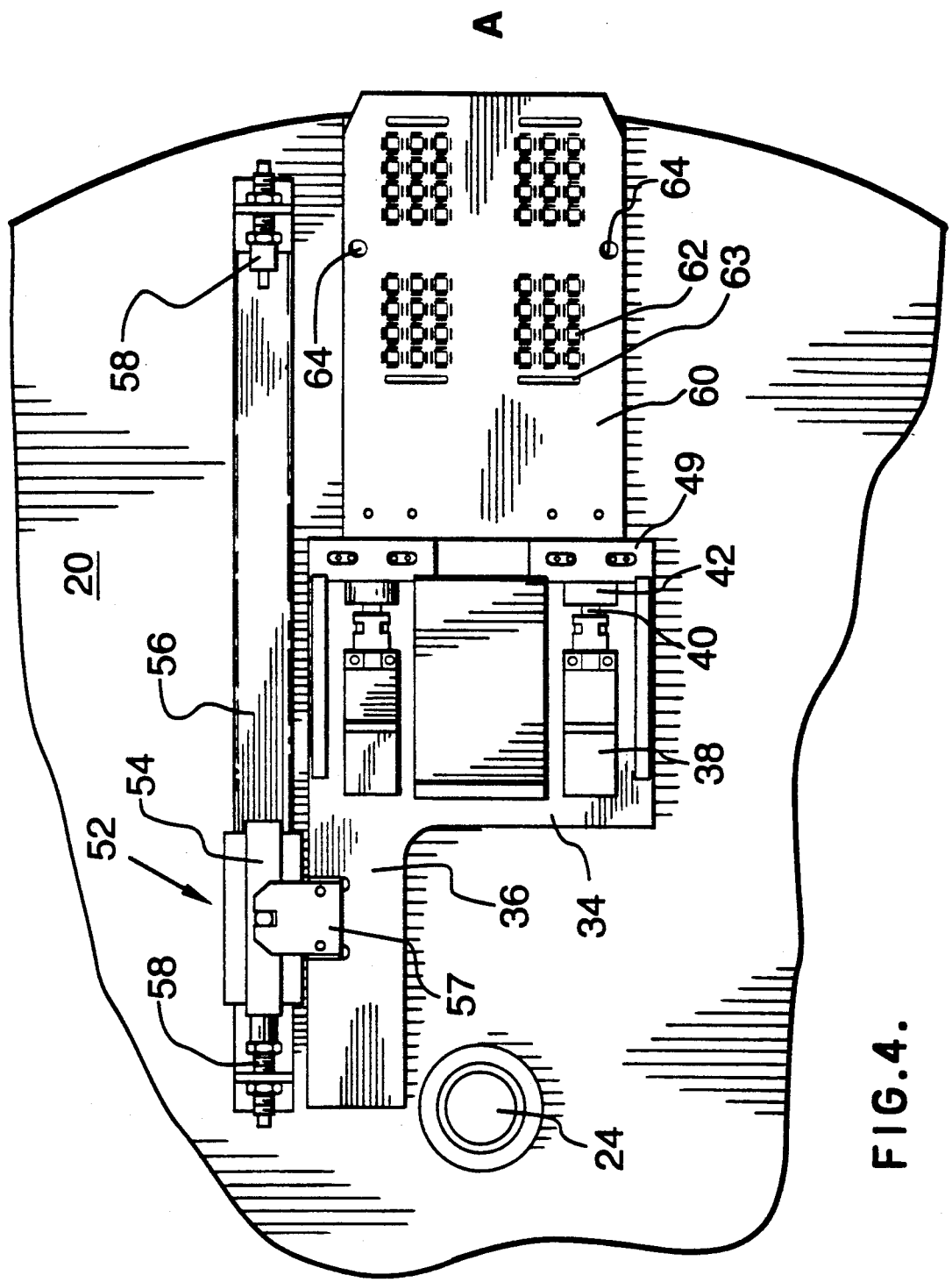
FIG. 4 is a front view of a workstation, similar to FIG. 3 but additionally showing a transfer plate prior to entering the first molding machine.
Figure 5:
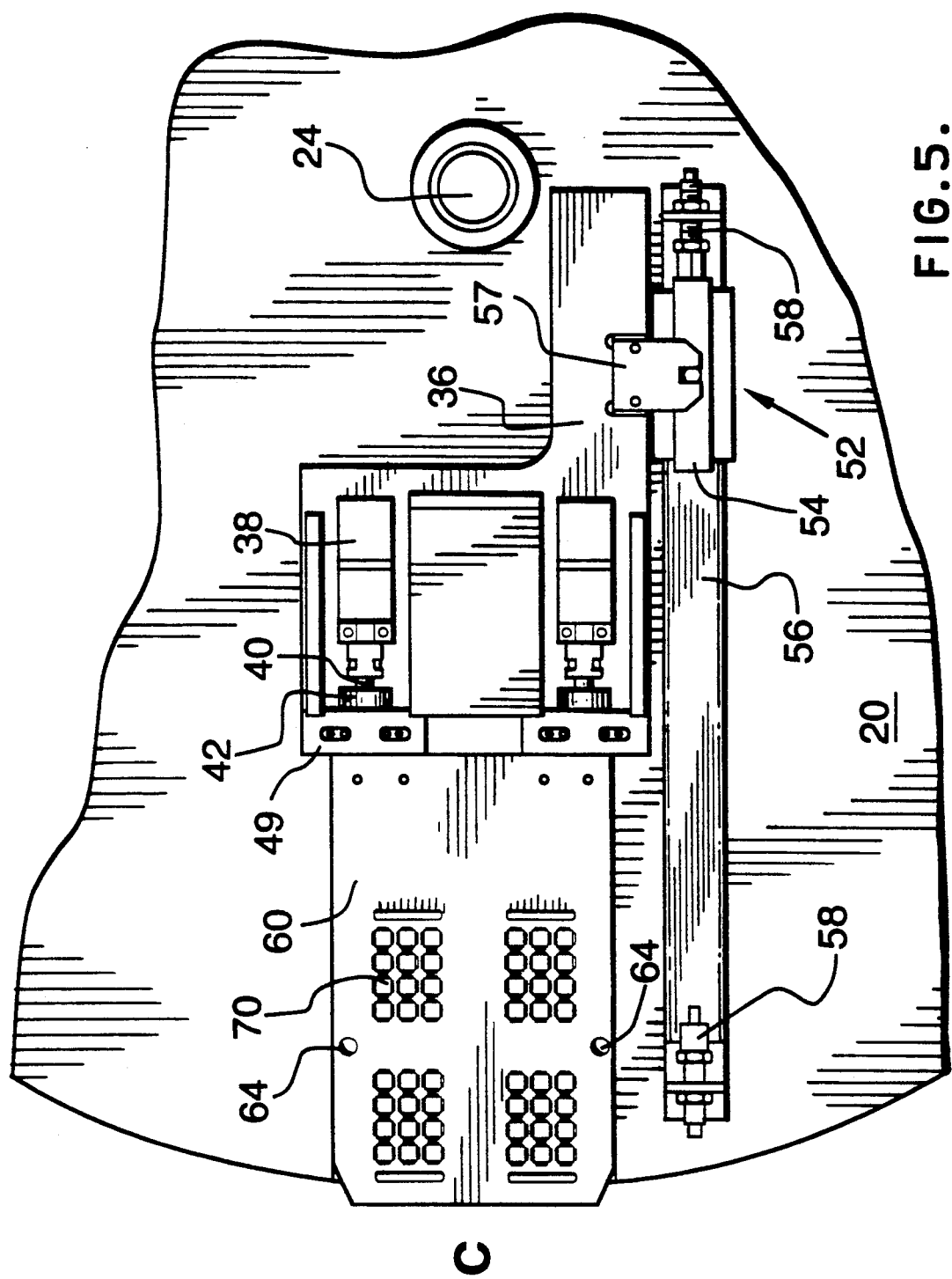
FIG. 5 is a front view of a workstation, similar to FIG. 4 but additionally showing molded items carried on a transfer plate after leaving the second molding machine.

With reference to FIGS. 3 and 4, each of the two plate carriers 46 has a pair of unthreaded holes for accepting one of two pairs of bolts that hold transfer plate 60 on header assembly 30. As will be further described subsequently, the transfer plate 60 has four sets of telephone keys, each set being comprised of 12 generally-square apertures 62 and an adjacent slit-like aperture 63. A pair of guide holes 64 extend through each side of transfer plate 60; one of a pair of guide rods 66 on a movable platen 68 of a molding machine (FIG. 6A) extends through a respective one of the guide holes 64 to align transfer plate 60 with the platens of the molding machine during the molding process. FIG. 4 illustrates an empty transfer plate ready to enter a first molding machine at position A in FIG. 1. FIG. 5 illustrates a transfer plate after it has left the second molding machine at position C in FIG. 1. The transfer plate of FIG. 5 is carrying a series of finished molded telephone keys 70. Those keys will be removed from the transfer plate at position D in FIG. 1.

Figure 6A:
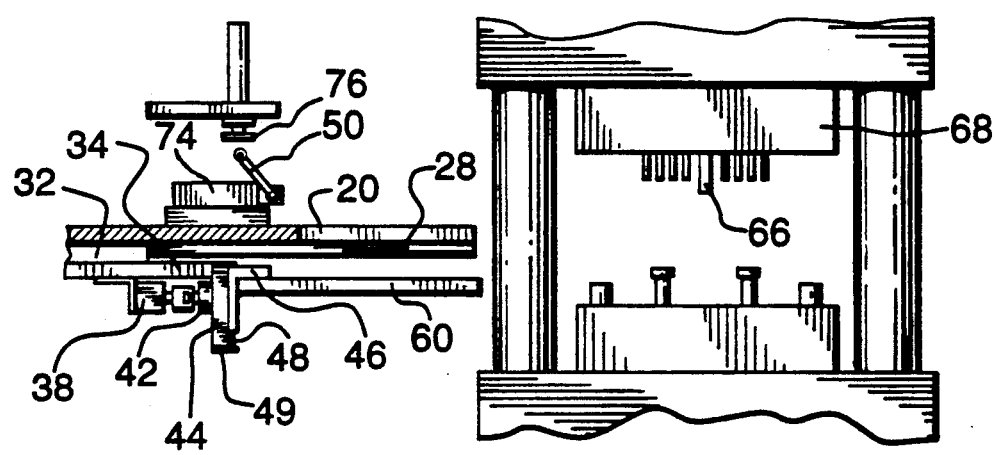
FIG. 6A is a plan view of a workstation and the two platens of a molding machine opposite position A in FIG. 1, the view illustrating a first stage in the engagement of the transfer plate with the two platens.
Figure 6B:
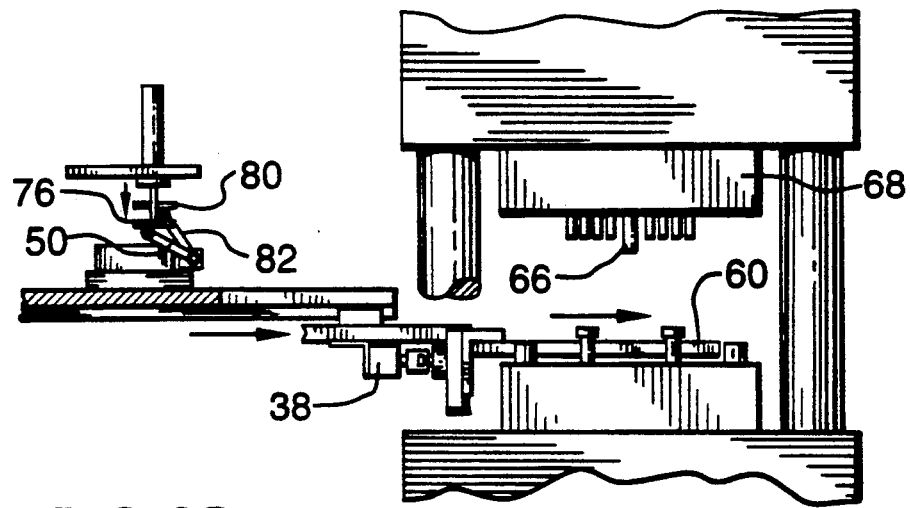
FIG. 6B is a similar plan view to FIG. 6A, but illustrating a second stage in the engagement.
Figure 6C:
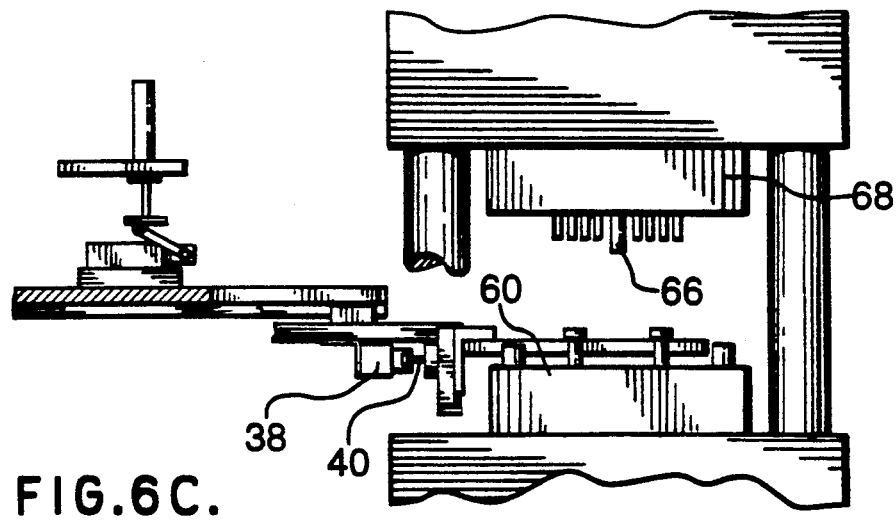
FIG. 6C is a similar plan view to FIG. 6A, but illustrating a third stage in the engagement.
Figure 6D:
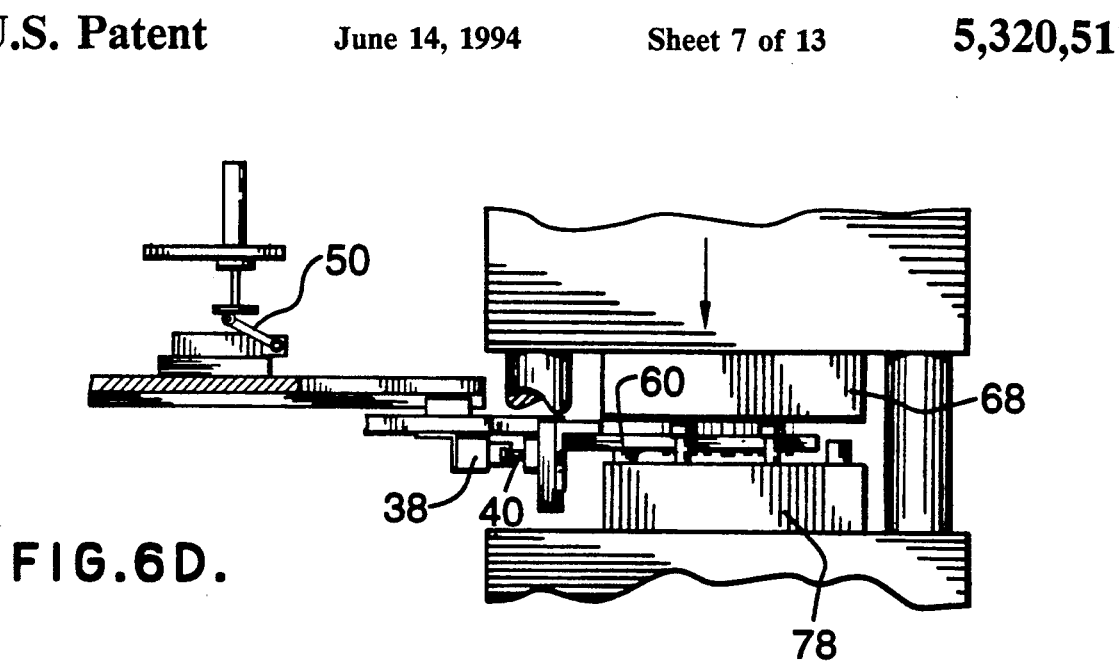
FIG. 6D is a similar plan view of FIG. 6A, but illustrating a fourth stage in the engagement.
Figure 6E:
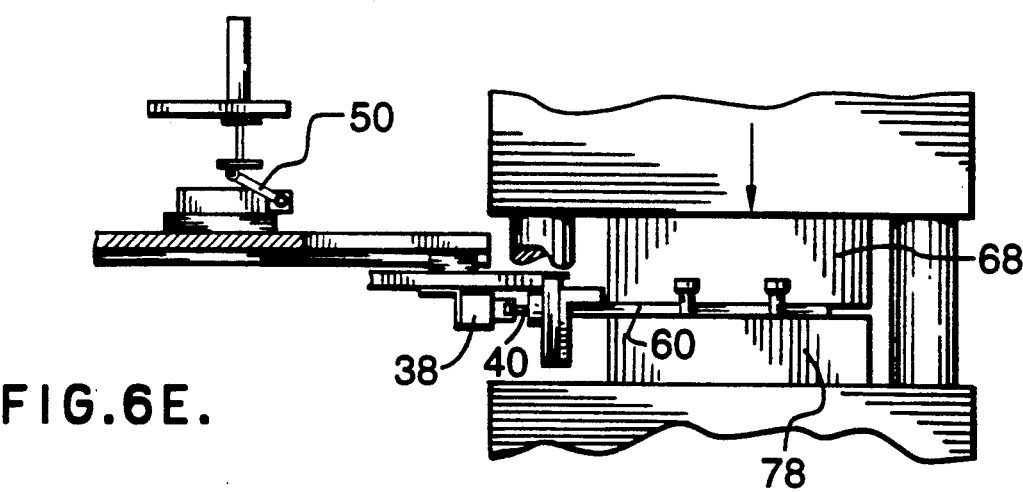
FIG. 6E is a similar plan view to FIG. 6A, but illustrating a fifth stage in the engagement.

FIGS. 6A to 6F illustrate the sequence of steps involved with the entry of a transfer plate 60 into one of the two molding machines (located opposite positions A and C in FIG. 1) of the molding apparatus. The first lever 50 on air valve 74, mounted to disk 20, is rotated by the action of a first piston 76. Air pressure then acts on pneumatic/magnetic piston assembly 52, moving header assembly 30 radially outward on disk 20 until transfer plate 60 sits between platens 68 and 78 (shown in FIG. 6B). Then pin 40 is retracted from plate carrier 46 by activation of a second piston 80, which rotates second lever 82 to supply air to cylinder 38 (shown in FIG. 6C). The platen 68 then moves against transfer plate 60 (FIG. 6D), and acts against the bias of spring 48 to press transfer plate 60 against platen 78 (FIG. 6E). The first injection molding step then occurs, as will be subsequently described further with respect to FIGS. 10A to 10E.

Figure 6F:
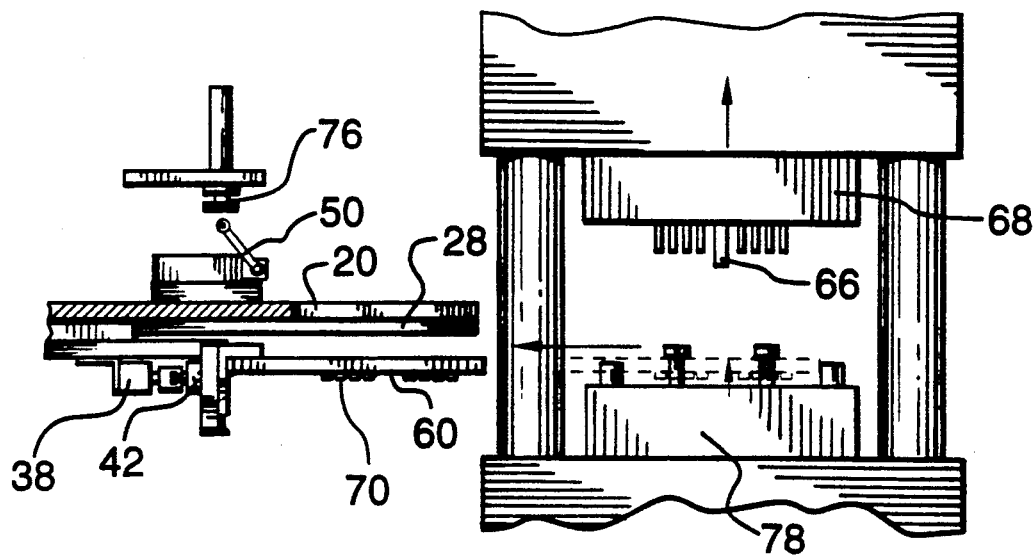
FIG. 6F is a similar plan view to FIG. 6A, but illustrating a sixth stage in the engagement.

Platen 68 then reverses the direction of its movement, and the bias of spring 48 moves transfer plate 60 away from abutment with platen 78. Second piston 80 is then retracted, which allows second lever 82 to rotate back to its original position and pin 40 to re-enter carrier plate 46 and lock that plate into position. First piston 76 is then retracted, which allows first lever 50 to rotate back to its original position and header assembly 30 to move radially inward on disk 20 (FIG. 6F). Transfer plate 60 is shown in partial cross-section in FIG. 6F, carrying sets of partially-molded telephone keys.

Figure 7A:
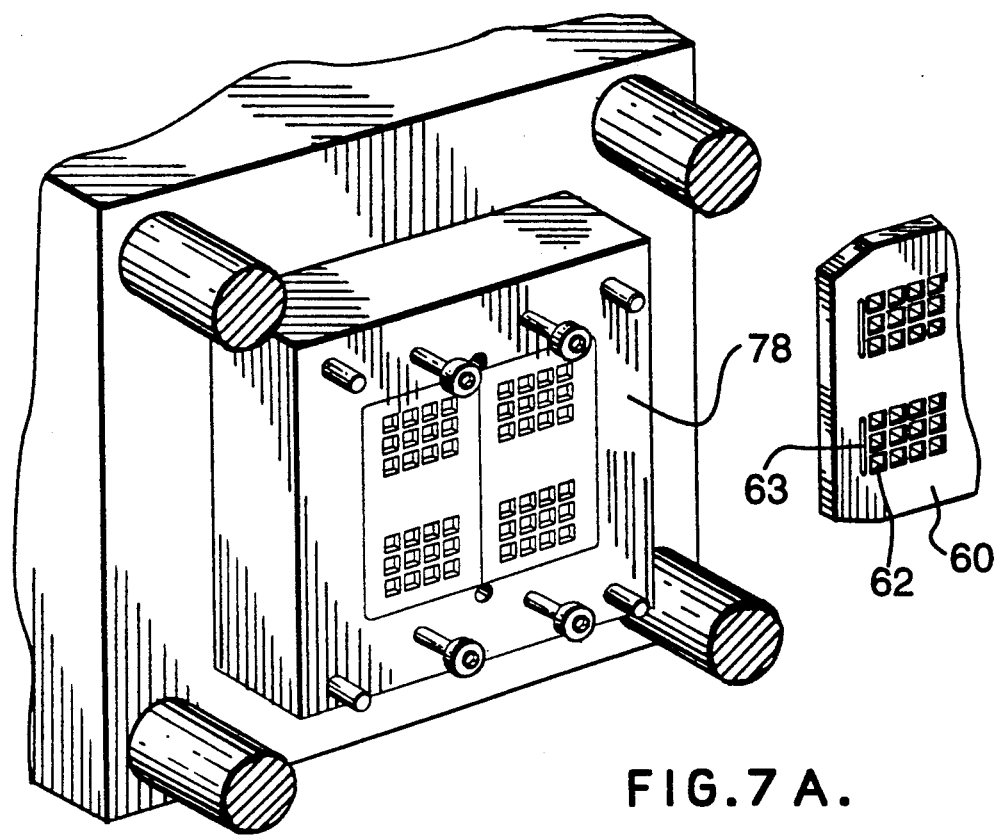
FIG. 7A is a perspective view of the relative position between the first and second molding platens of a molding machine opposite position A in FIG. 1.
Figure 7B:
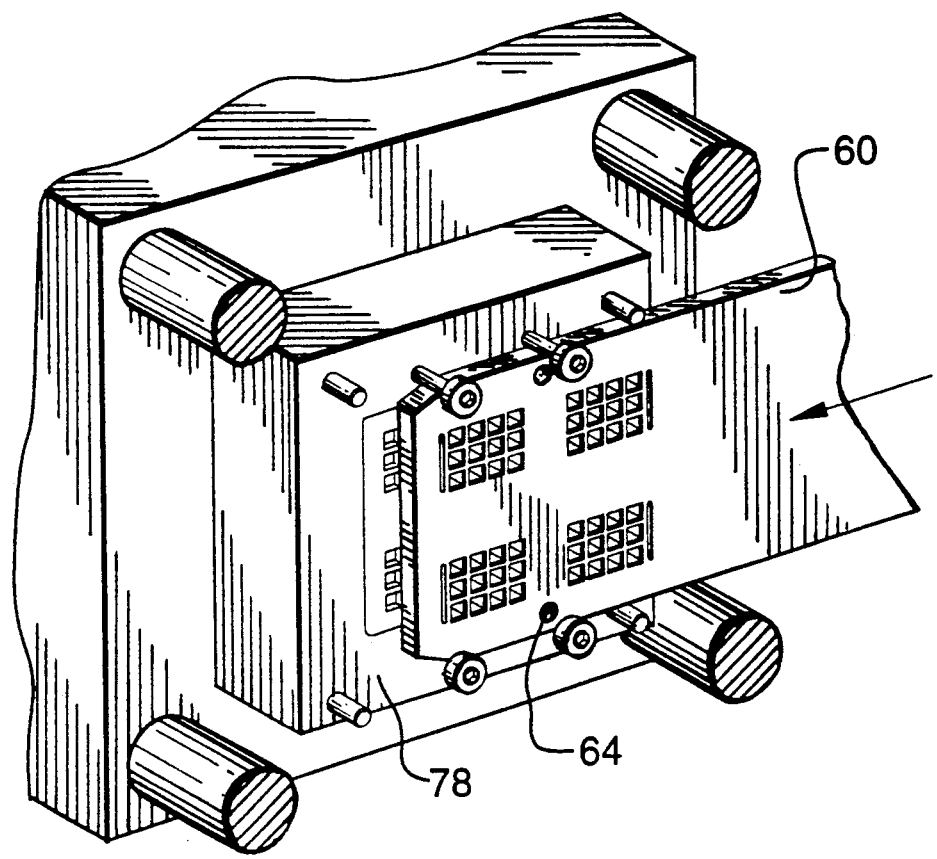
FIG. 7B is a perspective view similar to FIG. 7A, but additionally illustrating a transfer plate in position between the first and second molding platens.

FIGS. 7A and 7B are perspective views of the molding platens 68 and 78 of the workstation at position A (FIG. 1); FIG. 7B additionally shows a transfer plate 60. At position A, the platens 68 and 78 do not carry any respective cores or cavities corresponding to the slit-like apertures 63 in transfer plate 60. That follows from the fact that the slit-like apertures 63 are used for making long bar keys lacking alphanumeric lettering. Those bar keys are formed using a single injection molding at position C. Therefore, a transfer plate 60 leaving position A has the apertures 62 each filled with an inner plastic layer for each telephone key, but the apertures 63 are empty. For this reason, although FIGS. 6A to 6F illustrate the sequence of steps for inserting a transfer plate into molding machines opposite positions A and C, the platens 68 and 78 illustrated in those figures are those existing at position A only. Platens 68 and 78 in the molding machine opposite position C have respective extra cores and cavities with positions corresponding to those of the apertures 63.

Figure 9C:
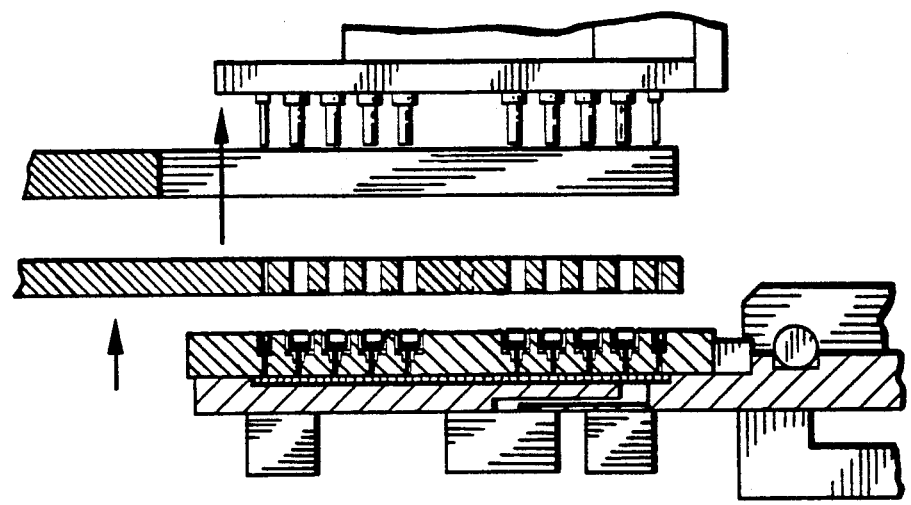
FIG. 9C is the third of a series of side views that illustrate molded items being removed from the apparatus.
Figure 9B:
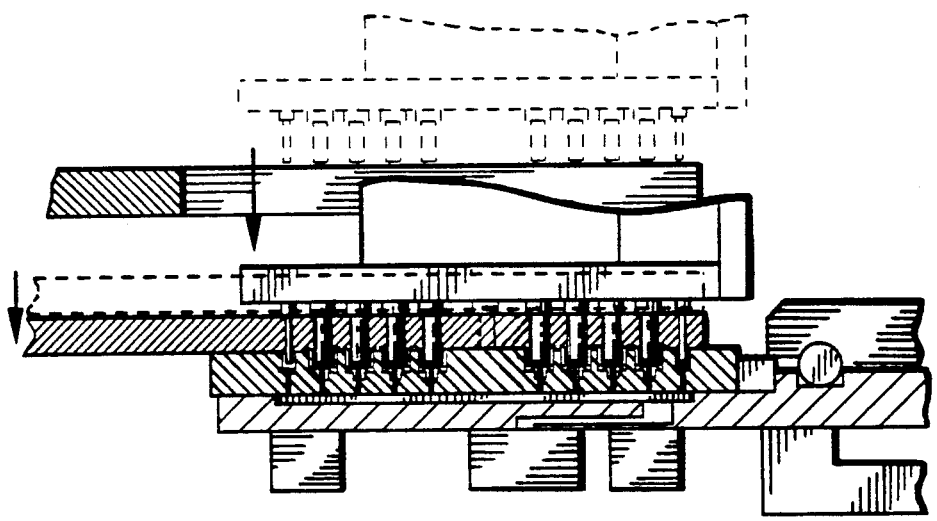
FIG. 9B is the second of a series of side views that illustrate molded items being removed from the apparatus.
Figure 9A:
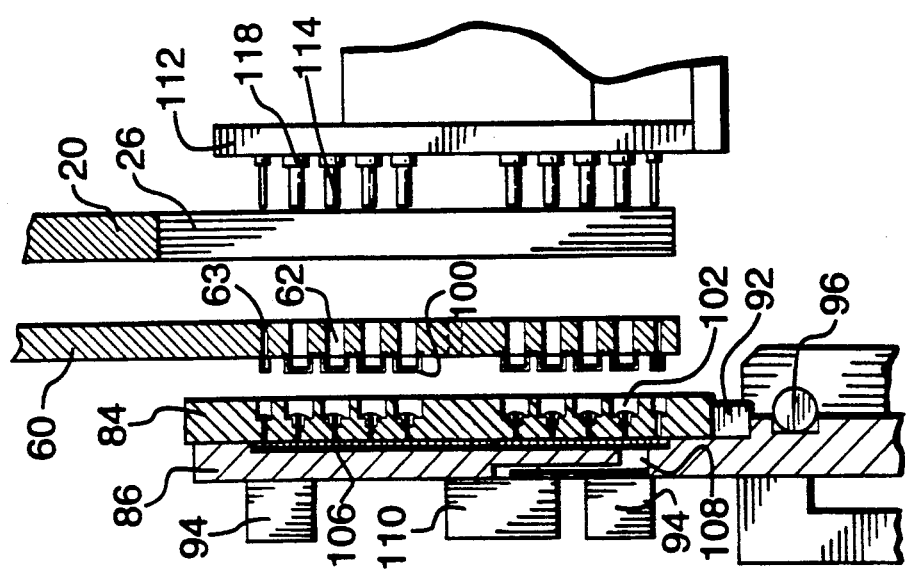
FIG. 9A is the first of a series of side views that illustrate molded items being removed from the apparatus.

FIG. 8A illustrates a removal tray 84 being moved into position on a rotatable platform generally designated 86. Platform 86 is a part of the equipment used to remove the finished telephone keys from a workstation at position D (see FIG. 1). Removal tray 84, which is carried to the molding apparatus on conveyor belt 88, has a pair of side flanges that slide onto a pair of rails 90 of platform 86. As tray 84 moves against abutment member 92, vacuum pumps 94 are activated to pull tray 84 tightly against platform 86. As shown in FIG. 8B, platform 86 is rotated around an axle 96 by a pneumatic cylinder 98; FIG. 9A shows the final position. Finished telephone keys 100 are retained on transfer plate 60, ready to be shifted into compartments 102 of complementary shape on removal tray 84. Each compartment 102 has a small channel 104 that connects with a chamber 106 defined by facing surfaces of tray 84 and platform 86. Chamber 106 is in turn connected by a channel 108 to a vacuum pump 110.

Vacuum pump 110 is activated, and pin 40 is retracted to allow transfer plate 60 to be moved away from disk 20. A vertical plate 112 carrying a series of pins 114 is moved through the radial opening 26 in disk 20 by the action of a pneumatic cylinder 116. The ends of pins 114 extend only as far as needed to push the finished telephone keys 100 off the face of transfer plate 60; the movement of pins 114 is halted by a shoulder 118 at the base of each pin coming into contact with the back of transfer plate 60. With keys 100 pushed into compartments 102, and being held in such position by vacuum pump 110, vertical plate 112 returns to its original position and spring 48 returns the emptied transfer plate 60 to its rest position. Pin 40 advances to lock plate 60 in that position. Vacuum pump 110 continues to hold keys 100 in position until platform 86 has been rotated to the horizontal orientation. Vacuum pumps 94 and 110 then cease operation, and the removal tray 84 is pushed onto an elevator platform 120 by a pneumatic actuator 122.

The elevator platform 120 lowers tray 84 until it is opposite a lower conveyor belt 124, and a pneumatic actuator 126 then pushes the tray 84 onto that belt. The elevator platform 120 then rises to its upper position. An arm 128 is retracted to a position from which it is able to push the next removal tray 84 across elevator platform 120 and onto platform 86. FIG. 8B illustrates some of the sensors 130 and 132 that are used by the control system to keep track of the position of the various moving parts of the apparatus; sensor 130 indicates when rotatable platform is horizontal, and sensor 132 indicates when elevator platform 120 is in the lower position.

Figure 10A:
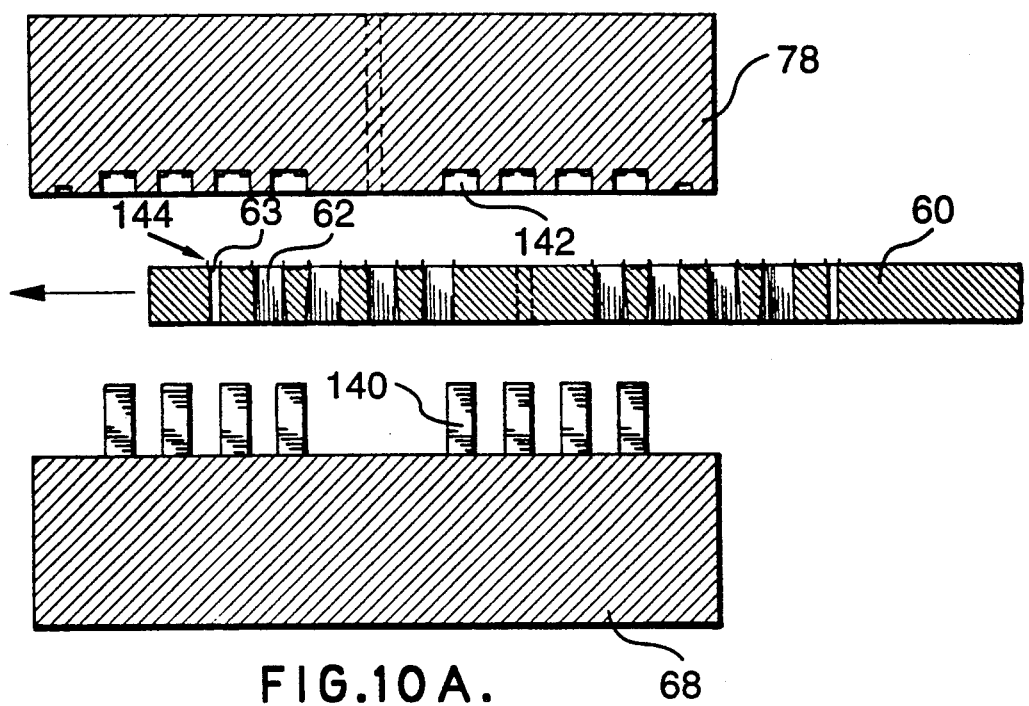
FIG. 10A is a plan view of a transfer plate and the core and cavity platens of a molding machine opposite position A in FIG. 1, the plate shown entering into the space between the platens.
Figure 10B:
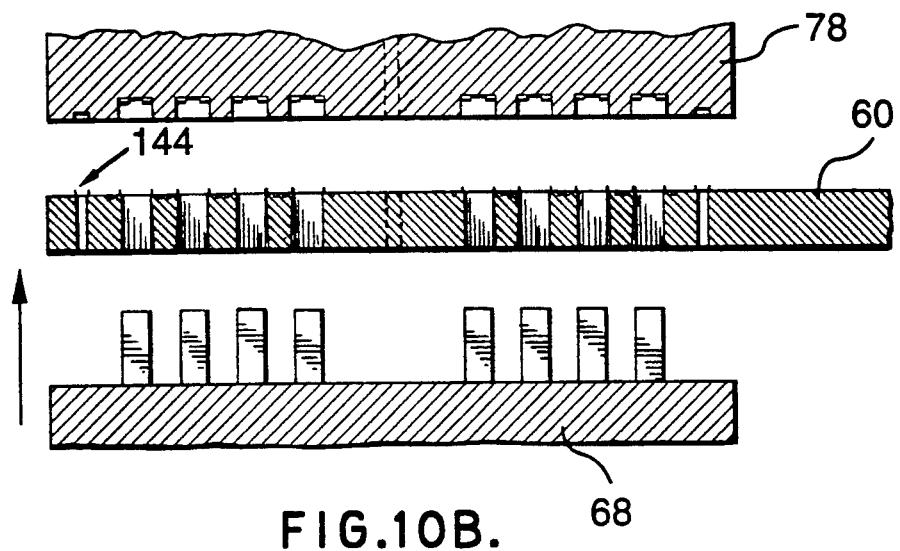
FIG. 10B is a second plan view of the transfer plate and platens of FIG. 10A, the view illustrating the transfer plate in position between the platens.
Figure 10C:
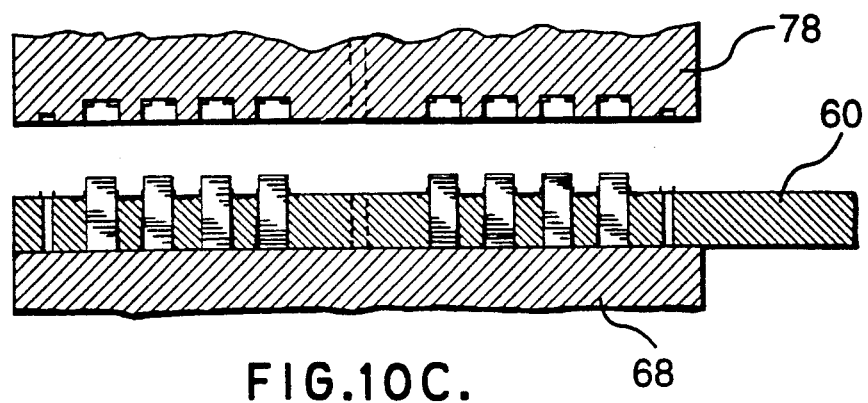
FIG. 10C is a third plan view of the transfer plate and platens of FIG. 10A, the view illustrating the core platen moved such that cores extend through the transfer plate.

FIGS. 10A to 10E illustrate the initial molding step which is performed while a transfer plate 60 is radially extended at the position A in FIG. 1. FIGS. 11A to 11D illustrate the second molding step which is performed while a transfer plate 60 is radially extended at the position C in FIG. 1. With reference to FIG. 10A, an empty transfer plate 60 is advanced between a movable platen 68 and a stationary platen 78. Platen 68 carries a series of cores 140, and platen 78 has a series of cavities 142 at corresponding locations. After plate 60 has been moved radially outward (and pin 40 released), platen 68 advances (FIG. 10B) and presses transfer plate 60 (FIG. 10C) against platen 78. FIGS. 10A and 10B illustrate fine wires 144 that extend from transfer plate 60 adjacent the apertures 62; it is the wires 144 that hold the molded plastic items on transfer plate 60.

Figure 10D:
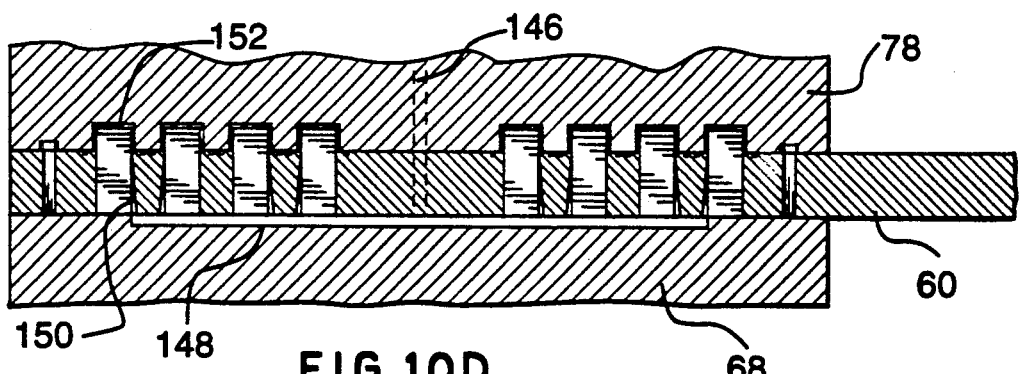
FIG. 10D is a fourth plan view of the transfer plate and platens of FIG. 10A, the view illustrating the cavity platen moved such that the cores extend into the cavities, and illustrating plastic injected into the mold cavities during a first injection process.
Figure 10E:
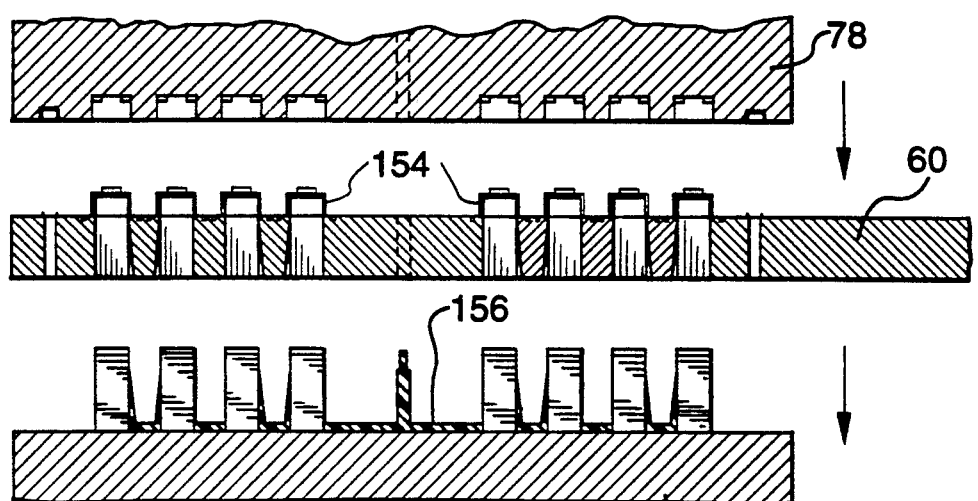
FIG. 10E is a fifth plan view of the transfer plate and platens of FIG. 10A, the view illustrating the core and cavity platens separated from the transfer plate, which is holding molded items after the first injection process.

FIG. 10D illustrates plastic injected under approximately 100 tons/inch$^2$ pressure. The plastic flows through channel 146 into a channel 148 surrounding the base of the cores 140, and then into smaller wedge-shaped channels 150 which are defined by the sides of the cores 140 and the sides of the apertures 62 in transfer plate 60. Channels 150 feed plastic into the mold chambers 152 which are each defined by the space between the end of a core 140 and a corresponding cavity 142. The pins 144 are within the mold chambers 152 during the plastic injection and, when platen 68 is retracted (FIG. 10E), the plastic items 154 created in this initial stage of the molding process are held on transfer plate 60 by those pins. Each plastic item 154, which forms the inner layer of a telephone key 100, carries a raised alphanumeric character. A web 156, formed by the plastic that remained in channels 148 and 150 at the end of the injection process, is pulled away from platen 68 by the action of retracting that platen. The webs 156 are saved in a bin under the molding machine, and subsequently melted into plastic that is recycled.

Figure 11A:
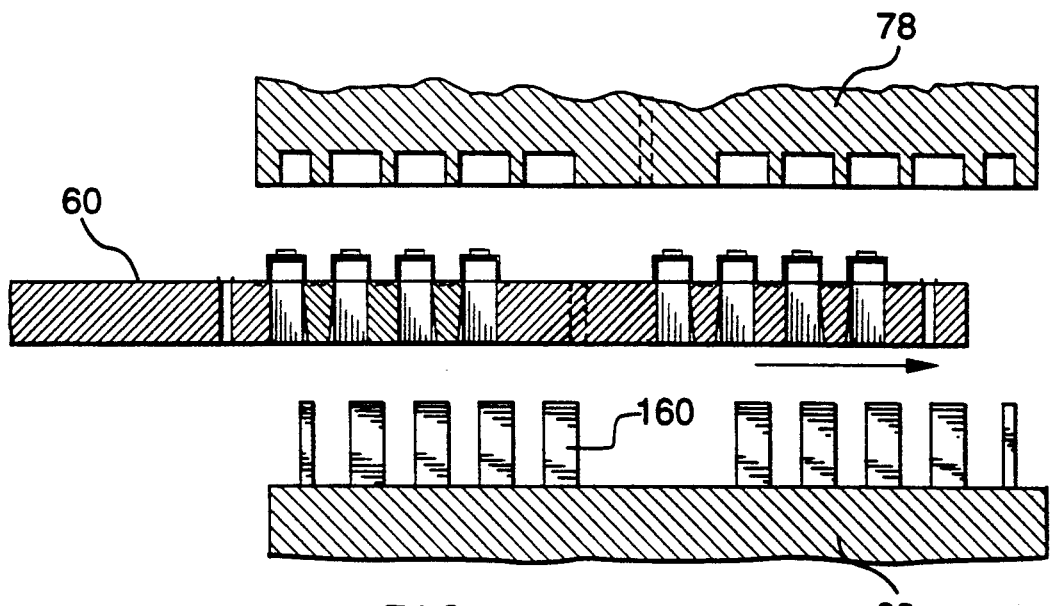
FIG. 11A is a first plan view of the transfer plate of FIG. 10A and the core and cavity platens of a molding machine opposite position C in FIG. 1, the plate shown entering into the space between the platens.
Figure 11B:
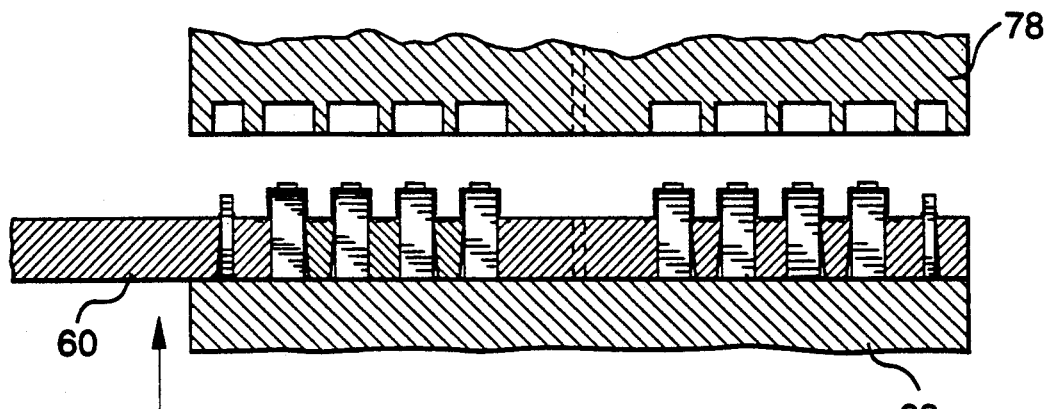
FIG. 11B is a second plan view of the transfer plate and platens of FIG. 11A, the view illustrating the core platen moved such that cores extend through the transfer plate.
Figure 11C:
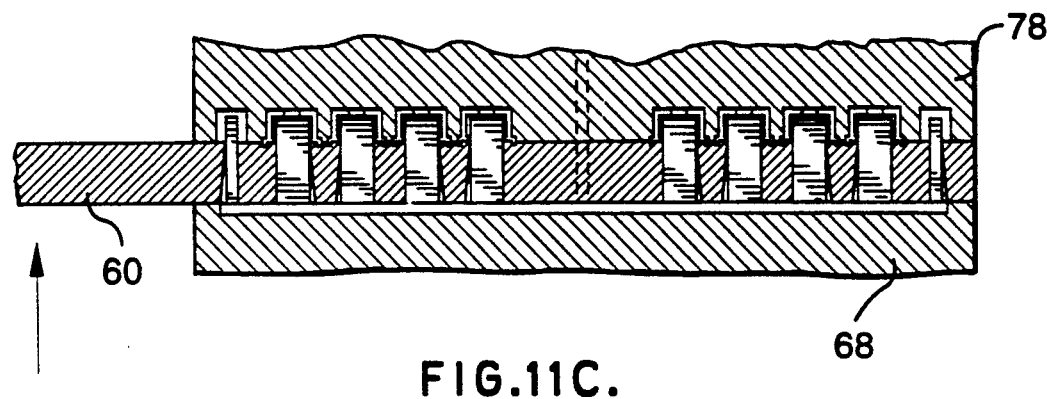
FIG. 11C is a third plan view of the transfer plate and platens of FIG. 11A, the view illustrating the cavity platen moved such that the cores extend into the cavities, and illustrating plastic injected into the mold cavities during a second injection process.
Figure 11D:
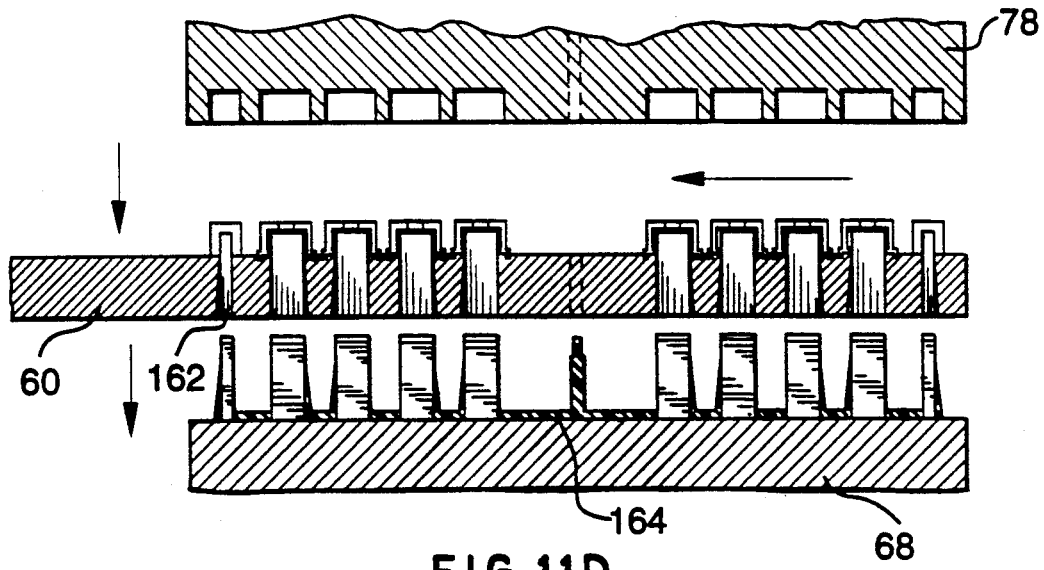
FIG. 11D is a fourth plan view of the transfer plate and platens of FIG. 11A, the view illustrating the core and cavity platens separated from the transfer plate, which is holding molded items after the second injection process.

Transfer plate 60 is then radially retracted on disk 20, and that disk is rotated such that plate 60 moves from position A to position C in FIG. 1. Position C is opposite a second molding machine. Transfer plate 60 is then moved radially outward into the second molding machine, as shown in FIG. 11A. A second injection process similar to the process just described is then used to inject an outer layer of plastic over the plastic items 154 (FIGS. 11A to 11D), as well as to create the single-injection bar keys in the 4 slit-like apertures 63. Each core 160 on platen 68 of the second molding machine pushes the respective plastic item 154 off the associated pins 144, and holds that item such that its alphanumeric lettering abuts the top of the respective cavity in platen 78. The second plastic is then injected along channels 162 which are defined by the sides of the cores 160 and adjacent sides of transfer plate 60. Transfer plate 60 is separated from platens 68 and 78, and moves radially inward. Web material 164 is ejected, and is subsequently recycled. Disk 20 is rotated one-quarter turn and the finished molded telephone keys are removed at position D (as previously described). There is no action taken on transfer plate 60 as it sits at position B.

The two molding machines used are the Engel Model 100 machines (where the '100' indicates 100 tons of total clamp pressure).

What is claimed as the invention is:

1. A multiple-injection molding apparatus utilizing a plurality of separate single-injection unit molding machines to create multiple-injection molded items, the apparatus comprising:
   (a) a rotatable disk having a series of workstations on it an equiangular positions, each workstation having a transfer plate being radially inwardly and outwardly movable on the disk and adapted to hold the items being molded by the molding machines;
   (b) a plurality of separate single-injection unit molding machines, the molding machines being positioned around the periphery of the disk such that each of the molding machines is adjacent a corresponding workstation, each molding machine having a first molding platen and a second molding platen, each transfer plate on each rotatable disk being adapted to be extended radially outward on the disk to sit between the first and second platens of a corresponding molding machine during injection molding by said corresponding molding machine; and,
   (c) removal means to remove the molded items from the molding apparatus; whereby at a first angular position of the disk a first molding machine creates an initial form of the molded items on a transfer plate, and at subsequent angular positions of the disk to the other molding machines create the final form of the molded items on the transfer plate prior to removal by the removal means.

2. A molding apparatus as in claim 1, wherein the apparatus utilizes two single-injection unit molding machines, the two machines being positioned on diametrically-opposite sides of the rotatable disk.

3. A molding apparatus as in claim 1, wherein the disk extends in a vertical plane, and wherein the platens of each molding machine move in a horizontal direction.

4. A molding apparatus as in claim 2, wherein the disk extends in a vertical plane, and wherein the platens of each molding machine move in a horizontal direction.

5. A molding apparatus as in claim 1, wherein the molded items are held on the transfer plate by a series of pins extending from the transfer plate into the space occupied by the initial form of the molded items.

6. A molding apparatus as in claim 1, wherein one of the first and second platens of each molding machine is a core platen and the other platen is a cavity platen, and wherein during injection molding a series of cores on the core platen extend through a corresponding series of apertures in the transfer plate into a corresponding series of cavities in the cavity platen, the shape of the molded items corresponding to the injection molds defined by the relative spacing between the cores and the cavities in the cavity platen.

7. A molding apparatus as in claim 1, wherein one of the first and second platens of each molding machine is a core platen and the other platen is a cavity platen, wherein during injection molding a series of cores on the core platen extend through a corresponding series of apertures in the transfer plate into a corresponding series of cavities in the cavity platen, the shape of the molded items corresponding to the injection molds defined by the relative spacing between the cores and the cavities in the cavity platen, and wherein the relative size of the cores and the transfer plate apertures is such that during injection molding the surface of the cores and transfer plate apertures together define injection channels for material being injected into the injection molds.

8. A molding apparatus as in claim 1, wherein the removal means comprises a series of pins that are adapted to extend through the transfer plate at an angular position of the disk where the molded items are to be removed from the plate, and wherein the removal means further comprises an arm adapted to hold a removal tray adjacent the transfer plate and having a suction means for holding the molded items in the removal tray after the pins have extended through the transfer plate to push the molded items out of the transfer plate.

9. A double-injection molding apparatus utilizing two separate single-injection unit molding machines to create double-injection molded items, the apparatus comprising:
(a) a rotatable disk having four workstations on it at equiangular positions, each workstation having a transfer plate being radially inwardly and outwardly movable radially on the disk and adapted to hold the items being molded by the said two molding machines;
(b) two separate single-injection unit molding machines being positioned adjacent diametrically-opposite sides of the rotatable disk, each molding machine having a first molding platen and a second molding platen, a transfer plate on the rotatable disk at each workstation being adapted to be extended radially outward on the disk to sit between the first and second platens of a corresponding molding machine during injection molding by said corresponding molding machine; and,
(c) removal means to remove the molded items from the molding apparatus, the removal means being positioned adjacent the rotatable disk such that when two workstations on the disk are adjacent the two molding machines a third workstation is adjacent the removal means; whereby the rotatable disk assumes four successive angular positions, a first molding machine creating an initial form of the molded items on a transfer plate at the first angular position, no operation being performed at the second angular position, a second molding machine creating a further form of the molded items on the particular transfer plate at the third angular position, and the removal means removing the molded items from the molding apparatus at the fourth angular position.

10. A molding apparatus as in claim 9, wherein the rotatable disk extends in a vertical plane, wherein the two molding machines are each positioned horizontally opposite on the apparatus, and wherein the removal means is positioned below the disk.

11. A molding apparatus as in claim 9, wherein the molded items are held on the transfer plate by a series of pins extending from the transfer plate into the space occupied by the initial form of the molded items.

12. A molding apparatus as in claim 9, wherein one of the first and second platens of each molding machine is a core platen and the other platen is a cavity platen, and wherein during injection molding a series of cores on the core platen extend through a corresponding series of apertures in the transfer plate into a corresponding series of cavities in the cavity platen, the shape of the molded items corresponding to the injection molds defined by the relative spacing between the cores and the cavities in the cavity platen.

13. A molding apparatus as in claim 9, wherein one of the first and second platens of each molding machine is a core platen and the other platen is a cavity platen, wherein during injection molding a series of cores on the core platen extend through a corresponding series of apertures in the transfer plate into a corresponding series of cavities in the cavity platen, the shape of the molded items corresponding to the injection molds defined by the relative spacing between the cores and the cavities in the cavity platen, and wherein the relative size of the cores and the transfer plate apertures is such that during injection molding the surface of the cores and transfer plate apertures together define injection channels for material being injected into the injection molds.

14. A molding apparatus as in claim 9, wherein the removal means comprises a series of pins that are adapted to extend through the transfer plate at an angular position of the disk where the molded items are to be removed from the plate, and wherein the removal means further comprises an arm adapted to hold a removal tray adjacent the transfer plate and having a suction means for holding the molded items in the removal tray after the pins having extended through the transfer plate to push the molded items out of the transfer plate.

* * * * *